(12) United States Patent
Paryzek et al.

(10) Patent No.: US 9,042,905 B2
(45) Date of Patent: May 26, 2015

(54) AUTOMATIC CONFIGURATION OF TELECOMMUNICATION STATION SETS

(75) Inventors: Andrew Paryzek, Ottawa (CA); Kent Felske, Kanata (CA); Denis Plante, Ottawa (CA)

(73) Assignee: RPX CLEARINGHOUSE LLC, San Francisco, CA (US)

(*) Notice: Subject to any disclaimer, the term of this patent is extended or adjusted under 35 U.S.C. 154(b) by 627 days.

(21) Appl. No.: 11/613,493

(22) Filed: Dec. 20, 2006

(65) Prior Publication Data
US 2008/0152098 A1 Jun. 26, 2008

(51) Int. Cl.
| | |
|---|---|
| H04M 1/253 | (2006.01) |
| H04M 11/06 | (2006.01) |
| H04M 1/675 | (2006.01) |
| H04M 1/725 | (2006.01) |
| H04M 3/42 | (2006.01) |

(52) U.S. Cl.
CPC ............ H04M 1/2535 (2013.01); H04M 11/06 (2013.01); H04M 2242/30 (2013.01); H04M 1/675 (2013.01); H04M 1/7253 (2013.01); H04M 1/72563 (2013.01); H04M 3/42272 (2013.01)

(58) Field of Classification Search
CPC .................................................... H04M 1/2535
USPC .................... 455/456.1–6; 379/93.02, 201.06
See application file for complete search history.

(56) References Cited

U.S. PATENT DOCUMENTS

| | | | |
|---|---|---|---|
| 5,363,425 A | 11/1994 | Mufti et al. | |
| 7,715,790 B1* | 5/2010 | Kennedy ...................... | 455/41.2 |
| 2002/0042277 A1* | 4/2002 | Smith ........................... | 455/456 |
| 2002/0164995 A1* | 11/2002 | Brown et al. ................. | 455/456 |
| 2003/0064732 A1* | 4/2003 | McDowell et al. ........... | 455/456 |
| 2003/0097302 A1* | 5/2003 | Overhultz et al. ............. | 705/14 |
| 2003/0124979 A1* | 7/2003 | Tanada et al. .................. | 455/41 |
| 2003/0144011 A1* | 7/2003 | Richards et al. .............. | 455/456 |
| 2003/0220737 A1* | 11/2003 | Smith et al. ................... | 701/213 |
| 2004/0203846 A1* | 10/2004 | Caronni et al. ............ | 455/456.1 |
| 2004/0203895 A1* | 10/2004 | Balasuriya ................. | 455/456.1 |
| 2005/0063528 A1* | 3/2005 | Pearson et al. ........... | 379/211.01 |
| 2005/0136949 A1* | 6/2005 | Barnes, Jr. .................... | 455/461 |

* cited by examiner

Primary Examiner — Kent Chang
Assistant Examiner — Chayce Bibbee
(74) Attorney, Agent, or Firm — Anderson Gorecki & Rouille LLP

(57) ABSTRACT

A telecommunication station set such as an IP phone is configured based on proximity of a user. Proximity of the user relative to the station set can be determined using RF-ID, UWB, GPS, direct user input, contextual information or other technology. For example, the user may carry a badge equipped with an RF-ID tag. The RF-ID tag is operative in response to an RF-ID reader associated with the phone, when in close proximity, to signal user ID and password, which may be encrypted. The user ID and password are sent to a SIP server, which authenticates the user and retrieves user-specific configuration details which are returned to the IP phone. The IP phone configures itself with the user-specific parameters. If the user moves away from the phone, as determined by the RF-ID tag being out of range of the reader, the IP phone de-configures itself.

29 Claims, 2 Drawing Sheets

AUTOMATIC CONFIGURATION OF TELECOMMUNICATION STATION SETS

FIELD OF THE INVENTION

This invention relates generally to the field of network communications, and more particularly to configuration of telecommunication station sets with user-specific settings.

BACKGROUND OF THE INVENTION

Although the field of telecommunications is mature, considerable innovations continue to be made to enhance performance and accommodate the needs of subscribers. Modern station sets are feature-rich devices which are capable of being highly customized to satisfy subscriber preferences. However, configuring a station set in order to add it to a network, move it within the network, or change its settings to meet the needs of an individual can be time consuming. In the context of a large enterprise, the cumulative burden of configuring station sets can be considerable. This problem has become even more acute with the introduction of telecommunications station sets based on the IP protocol which cannot be completely configured from a central switch, as is done in TDM-based systems such as PBXs.

SUMMARY OF THE INVENTION

In accordance with one embodiment of the invention, an apparatus that facilitates configuration of a telecommunications station set comprises: proximity determination circuitry operable in conjunction with the device to provide an indication that the user is within a predetermined proximity to the station set; and configuration circuitry operable in response to the proximity indication to configure the station set.

DETAILED DESCRIPTION

Figure 1:
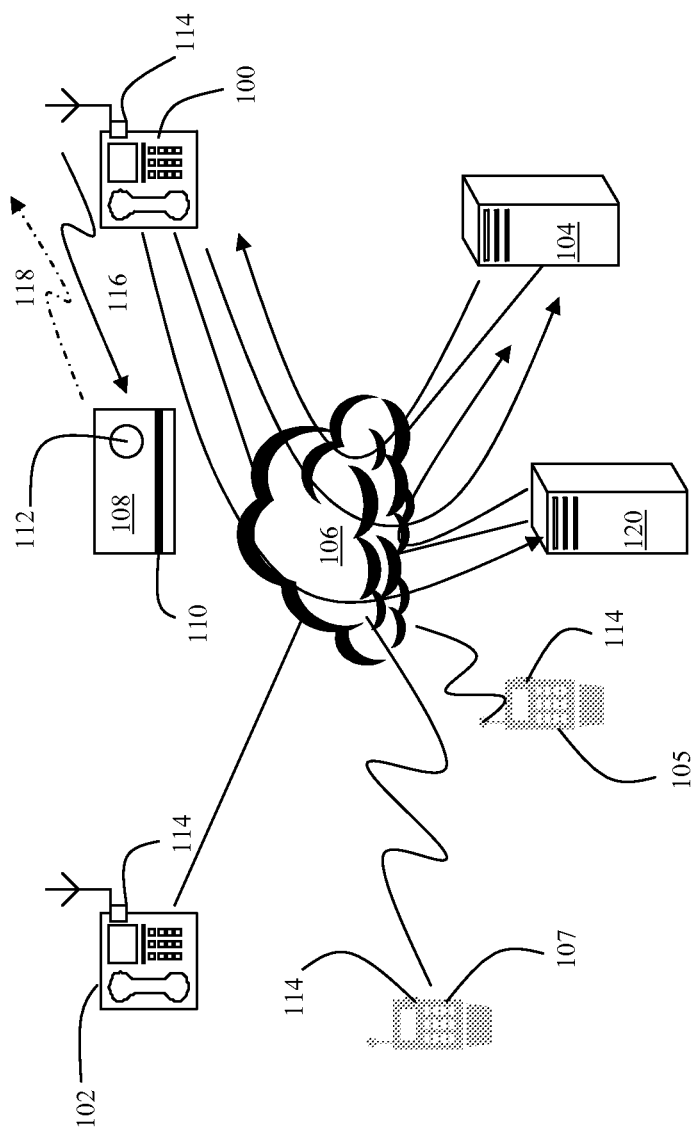
FIG. 1 illustrates a network adapted for automatic configuration of station sets based on proximity of a subscriber tag to the station set as determined by RF-ID.

FIG. 1 illustrates an abridged enterprise communications network. The network includes station sets which may be of any type, including, without any limitation, wired phones (100, 102) and wireless devices (105, 107), any or none of which might be IP-based. In the case of IP-based telephony, a session initiation protocol ("SIP") server (104) and a LAN (106) may be employed. When the IP phone (100, 102, 105, or 107) is initially connected to the network (106), or moved within the network, the IP phone requires initial configuration information before beginning operation, e.g., an IP address and the address of the SIP server. That information may be obtained by the phone in accordance with standard techniques, and is not the focus of the present invention. The present invention facilitates configuration of the IP phones (100, 102, 105, 107) with parameters that are user-specific or user type specific.

In one embodiment of the invention, configuration of any of the IP phones (100, 102, 105, 107, although phone 100 will be used in this example) with user-specific parameters is triggered by a determination that the user is in close proximity to the phone. The user carries a device such as a badge (108) which identifies the user as a particular individual, or type. While this information might be conveyed from the badge (108) to the phone (100) by means of a magnetic strip (110) to a reader-equipped phone, a more automated system can be provided by embedding an RF-ID tag (112) in the badge. The IP phones (100, 102, 105, 107) are equipped with RF-ID readers (114) which transmit short range excitation signals. In a passive RF-ID system, when the RF-ID tag (112) is within range of, for example, phone (100), the excitation signal (116) is received by the RF-ID tag (112), modulated, and employed to transmit a response signal (118) which is received by the reader (1 14). In the illustrated embodiment, the RF-ID tag is operative to include an indication of user ID and password which are unique to the user. The IP phone is operative in response to the transmission from the RF-ID tag to relay the included data, i.e., user ID and password, to the SIP server (104). The SIP server uses the user ID and password information to index into a database in order to authenticate the user. Further, the SIP server uses the user ID to obtain user-specific configuration details from the database. When authentication and configuration data retrieval is complete, the SIP server provides an indication of authentication along with the configuration parameters to the IP phone (100). In response, the IP phone enables itself for use, and configures itself with the configuration parameters.

The IP phone (100) may also be de-configured, and the user may log-in and log-off relative to various phones as the user moves. If the user moves out of range of phone (100) and into range of phone (102), then phone (102) is configured with the user-specific parameters and phone (100) is de-configured relative to the user-specific parameters. For example, the user could use the badge a first time to log-in to phone (100), and a second time to log-off of phone (100). A de-configured phone could be inactivated or configured with a basic or generic set of configuration parameters. Examples of configuration parameters include, but are not limited to, greeting, filtering, ringtone, speed-dial, outgoing caller-ID, friend on-line list, and voice dial.

In an alternative embodiment, a proxy/control server (120) maintains associations between the ID embedded in the RFID badge and the particular user credentials. In response to user proximity as indicated by badge, the IP phone (100) is operable to signal the ID to the proxy/control server (120). The ID can be encrypted for additional security. The proxy/control server then communicates with the SIP server on the user's behalf to prompt signaling of the configuration parameters from the SIP server to the IP phone (100). Another model is to have the user ID determined and sent to the proxy/control server. Subsequently, user and login credentials are sent to the phone with the phone logging itself in. Although illustrated as a separate device, the proxy/control server functionality could be integrated into the SIP server.

Contextual information can be used to indicate proximity, in lieu of proximity, or in addition to proximity. Contextual information includes indications of when the user will be near to a particular phone. For example, a user could be predicted to be in the office during normal working hours. Similarly, a person could be predicted to be outside the office unless logged-in to the building based on badge or network usage. Alternatively, the phone itself could be equipped with an external controller such as a button or switch (the keypad could also be used). Further, a user who maintains an electronic schedule that indicates venue could be predicted to be near to particular phones at particular dates and times.

Depending on the requirements of the user and the enterprise, additional features may be employed to enhance security. For example, if it is desired to limit use of a particular phone to a particular user, then the system can be configured to deny access to other users. This can be accomplished by the authentication function of the SIP server (104), i.e., by limiting authentication to a particular user ID and password. Alternatively, the RF-ID reader (114) may be modified to respond only to a particular user ID and password. RF-ID tags can also be configured to be responsive to only certain excitation signals, i.e., from a single phone, subset of phones, or certain types of phones. Additional security can be provided by encrypting the user ID and password provided by the RF-ID tag. Decryption could be done by the IP phone. However, performing decryption at the SIP server would generally be more secure. Further, the IP phone may be configured to de-configure itself relative to the user when the badge is no longer in range of the RF-ID reader. A timer circuit could be used to permit the badge to be out of range for a selected period before the IP phone de-configures itself. The IP phone may also disable itself when the badge moves out of range of the reader, in which case the user is logged-off. Use of the phone would then be coupled more tightly with individual users, i.e., it would be impractical for a user to make a call from another's phone in a manner that could not later be associated with the user making the call. The IP phone may also be equipped such that de-configuration, re-configuration and disabling of the phone requires special input such as a button or code. Such a feature could be particularly useful to prevent undesirable re-configuration where a mobile phone is inadvertently placed in close proximity to the badge of another. Further, as mentioned above, a phone may be "generally enabled" for use by anyone, i.e., anyone who does not have the benefit of the configuration service. The generally enabled phone would have a limited selection of enabled functions, and would not require a log-in in order to be utilized.

If it is desired to permit any member of a group of users to utilize the phone, the database utilized by the SIP server (104) can be configured accordingly. The phone would then configure itself with the user-specific parameters of the nearest RF-ID within range. This configuration might be particularly useful where offices or cubicles are shared between shifts or workdays, such as in call centers and satellite sales offices, respectively. Further, a user would have the advantage of an automatically configured alternate phone even when temporarily in another part of the enterprise, e.g., in a meeting room or a colleague's office. In order to provide privacy to the user and to prevent unauthorized use, the IP phone could be configured to disable itself and de-configure itself when the RF-ID moves out of range. This could be done via the proxy/control server (120), which would log the user off of the system. Again, a timer could be used to permit temporary movement beyond the RF-ID range if desired.

Rather than being user-specific, the configuration parameters could be user type specific. User type configuration could be desirable where badges are issued for relatively short duration, such as to visitors to an enterprise. For example, a visitor badge, or the badges of certain types of employees or contractors, might configure the IP phones such that access to sensitive information or calling capability, e.g., outside or international numbers, is restricted. The badge could be configured to identify the individual user when it is issued. However, if the privileges associated with the badge are sufficiently limited it may not be necessary to associate the individual with the badge.

Figure 2:
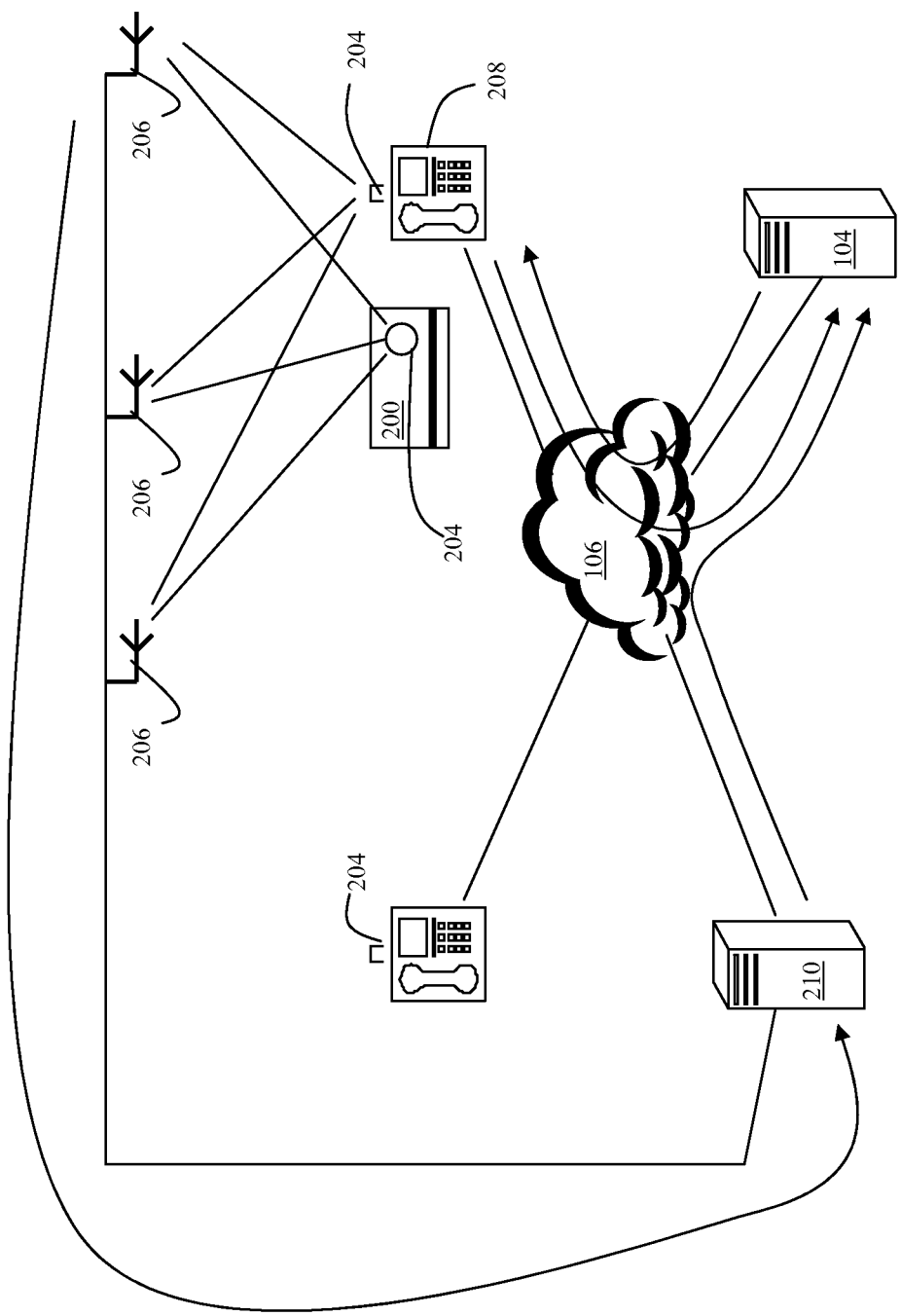
FIG. 2 illustrates a network adapted for automatic configuration of station sets based on proximity of a subscriber tag to the station set as determined by a location system that has sufficient accuracy such as those based on Ultra Wideband, Ultrasonic, infrared or other RF based location technologies such as WiFi based RTLS.

FIG. 2 illustrates an embodiment of the invention in which proximity of the badge (200) is not directly measured, but rather calculated by a location system which has sufficient accuracy such as those based on Ultra Wideband, Ultrasonic, infrared, or other RF based location technologies such as Wi-Fi based RTLS. In the case of UWB, the badge (200) and IP phones (202) are equipped with RF impulse generators (204). The RF impulse generators are operable to transmit signals which are received by RF impulse receivers (206) of an array of receivers. In the case of the RF impulse generator associated with the badge (200), the signal may include an indication of user ID and password. In the case of the RF impulse generator associated with the phone (208), the signal may include an indication of phone ID. The RF impulse receivers are disposed in known, fixed positions. RF impulse signals received by the receivers are associated with the receiver ID and relayed to a position calculation server (210). Utilizing the relayed data, the position calculation server calculates range and direction of the RF impulse generator relative to the known position of each RF impulse receiver which received a signal. Based upon relayed data from multiple RF impulse receivers, the position calculation server can calculate the actual position of the RF impulse generators (204) in three dimensional space. The position calculation server provides to the SIP server (104) either: (1) the position information (relative or actual) along with either phone ID or user ID with password; or (2) an indication of phone ID, user ID and password from RF impulse generators (204) that are within a predetermined range relative to one another. The SIP server uses the information from the position calculation server to configure the phone (208) with the user-specific parameters associated with badge (200). In particular, the SIP server uses the user ID and password information to index into a database in order to authenticate the user. Further, the SIP server uses the user ID to obtain user-specific configuration parameters from the database. When authentication and configuration data retrieval is complete, the SIP server provides an indication of authentication along with the configuration parameters to the IP phone (phone (200)) associated with the phone ID. In response, the IP phone enables itself for use, and configures itself with the user-specific configuration parameters.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. Apparatus that facilitates configuration of a telecommunications station set, comprising:
   proximity determination circuitry configured to provide an indication that a first user is within a predetermined proximity to the station set by detecting a first wireless device transported by the first user; and
   configuration circuitry adapted, in response to the proximity indication, to configure the station set for use by the first user by changing at least one parameter to a first active setting which is specific to the first user;

the proximity determination circuitry also configured to provide an indication that a second user is within closer proximity to the station set than the first user by detecting a second wireless device transported by the second user, the configuration circuitry adapted, in response to the proximity indication associated with the second user, to configure the station set for use by the second user by changing the at least one parameter to a second active setting which is specific to the second user if an authorizing input is also provided.

2. The apparatus of claim 1 further including a device configured to facilitate calculation of present location of the first user.

3. The apparatus of claim 2 wherein the configuration circuitry is adapted to configure the station set based at least in-part on data from the device.

4. The apparatus of claim 3 wherein the data includes at least one of unique ID, user ID and password.

5. The apparatus of claim 4 wherein the at least one of unique ID, user ID and password are encrypted.

6. The apparatus of claim 5 wherein the at least one of unique ID, user ID and password are decrypted by the configuration circuitry.

7. The apparatus of claim 5 further including authentication circuitry configured to authenticate the first user based on user ID and password.

8. The apparatus of claim 5 further including authentication circuitry configured to authenticate the first user based on a unique ID number which is translated into a user ID and password by circuitry.

9. The apparatus of claim 1 wherein the configuration circuitry is adapted to configure the station set with user-specific parameters.

10. The apparatus of claim 1 wherein the configuration circuitry is adapted to configure the station set with user type specific parameters.

11. The apparatus of claim 2 wherein the device includes an RF-ID tag.

12. The apparatus of claim 11 wherein the RF-ID tag is embedded in a badge.

13. The apparatus of claim 11 wherein the proximity determination circuitry includes an RF-ID reader associated with the station set.

14. The apparatus of claim 1 wherein the configuration circuitry includes a SIP server.

15. The apparatus of claim 14 wherein the configuration circuitry includes a server configured to decode a unique ID, and send a user ID and password to the SIP server.

16. The apparatus of claim 1 further including de-configuration circuitry adapted to de-configure the station set in response to an indication that the first user is outside a predetermined proximity to the station set.

17. The apparatus of claim 1 further including disabling circuitry configured to disable the station set in response to an indication that the first user is outside a predetermined proximity to the station set.

18. The apparatus of claim 2 wherein the device includes an ultra wide band RF pulse generator.

19. The apparatus of claim 18 wherein the RF pulse generator is configured to transmit an indication of user ID and password.

20. The apparatus of claim 18 wherein the proximity determination circuitry includes an ultra wide band RF pulse generator.

21. The apparatus of claim 20 wherein the RF pulse generator is configured to transmit an indication of station set ID.

22. The apparatus of claim 20 wherein the proximity determination circuitry further includes RF pulse receivers disposed in known locations.

23. The apparatus of claim 22 wherein the proximity determination circuitry further includes a position calculation server configured in response to data from the RF pulse receivers to calculate the position of the device relative to the station set.

24. The apparatus of claim 2 wherein the device includes a transceiver configured to provide an indication of device location, the transceiver being configured to utilize at least one of ultra wideband, ultrasonic, infrared and Wi-Fi based RTLS.

25. The apparatus of claim 24 wherein the proximity determination circuitry further includes a position calculation server configured in response to data from the transceiver to calculate the position of the device relative to the station set.

26. The apparatus of claim 1 wherein the proximity determination circuitry is configured to respond to contextual information.

27. The apparatus of claim 26 wherein the contextual information includes indications of when the user will be near to the station set.

28. The apparatus of claim 27 wherein the indications are derived from an electronic schedule.

29. The apparatus of claim 26 wherein the station set includes an external controller for signaling contextual information.

* * * * *